Sept. 20, 1966  R. O. CHAKROFF  3,273,917
COUPLING HAVING CONCENTRIC SPHERICAL SURFACES
SEALED BY LINE CONTACT
Filed Aug. 25, 1961  2 Sheets-Sheet 1

INVENTOR.
RICHARD O. CHAKROFF
BY
Jerome R. Cox
ATTORNEY

United States Patent Office 3,273,917
Patented Sept. 20, 1966

3,273,917
COUPLING HAVING CONCENTRIC SPHERICAL
SURFACES SEALED BY LINE CONTACT
Richard O. Chakroff, 298 Park Blvd.,
Worthington, Ohio
Filed Aug. 25, 1961, Ser. No. 133,974
6 Claims. (Cl. 285—263)

This invention relates to coupling devices for joining fluid conduits, and particularly to coupling devices for joining together such fluid conduits without the necessity for precisely aligning the longitudinal axes of the conduits to be joined. This application is a continuation-in-part of my copending applications Ser. No. 822,508 filed June 24, 1959, now abandoned, entitled Couplings and Ser. No. 830,795 filed July 31, 1959, entitled Coupling Devices (now Patent 3,002,771, issued Oct. 3, 1961), and the disclosure hereof includes embodiments similar to the embodiments disclosed in said copending applications, as well as additional improvements in combination therewith. The embodiments of my invention disclosed herein relate especially to mechanisms and methods for connecting together fluid conduits consisting of tubing, especially tubing of the type which is used for aircraft conduits.

The embodiments of my invention disclosed in this application show specifically members that are capable of readily joining together tubing such as aircraft conduits without the necessity of precisely aligning the longitudinal axes of the conduits to be joined, and in one embodiment without the necessity of precisely and accurately positioning longitudinally the ends of the conduits to be joined. Thus my couplings in all cases provide compensation for longitudinal misalignment, and in the alternative embodiment also take-up for longitudinal mismatch and for expansion or contraction of materials due to temperature changes.

In general, the coupling assembly of the present invention includes (1) a female clamping device; (2) a male clamping device; and (3) an intermediate coupling member which has an outer face or side of one end which is formed as an annular segment of an external spherical surface and has an inner face or side which is formed as an annular segment of an internal spherical surface. The outer face or side of the intermediate coupling member which is formed as an annular segment of an external spherical surface is in engagement with the female clamping member at a single line of tangency, and the inner face or side of the intermediate coupling member which is formed as an annular segment of an internal spherical surface is in engagement with the male clamping member at a single line of tangency.

Each of the clamping devices thus has a circular line of contact which engages the spherical surfaces of the intermediate coupling member both on the outer face of the intermediate coupling member (which is as shown in the drawings a convex face) and on the inner face (which is as shown in the drawings a concave face), and so both of the contacting surfaces of the two clamping members are urged into sealed engagement with the intermediate coupling member at a single line of tangency. The centers of the arcs of the two above mentioned spherical surfaces are coincident. Thereby substantial sliding engagement can occur between such spherical surfaces and the respective confronting surfaces or lines. This permits the clamping means to be drawn together into sealed relationship with the intermediate coupling member; notwithstanding possible misalignment of the longitudinal axes of the clamping members.

In the alternate embodiment, the coupling assembly provides in addition to the arrangements described in the last paragraph the formation of the opposite end of the clamping member as an assembly including a hollow cylinder or sleeve, and includes the provision of a hollow cylindrical member or sleeve which slides either within or over the hollow cylinder of the male member of the clamping device in fluid-tight relationship so as to provide takeup for longitudinal mismatch and to provide for expansion and/or contraction of the materials due to temperature changes.

It is an object of the present invention to provide a novel coupling assembly for joining conduits in fluid-tight or liquid-tight relationship, notwithstanding the fact that they are slightly misaligned and/or the fact that they are not positioned exactly at a definite longitudinal distance apart.

It is a further object of my invention to provide such a novel coupling assembly that can be manufactured as a satisfactory commercial device.

It is a further object of my invention to provide novel takeup arrangements for longitudinal mismatch and for longitudinal expansion and/or contraction of materials due to temperature changes and otherwise.

It is a further object of my invention to provide a novel fluid-tight relationship for a coupling device for joining together two lengths of tubings which are approximately aligned with each other but which may be slightly misaligned and/or which may be spaced from each other at varying distances.

Further objects and features of the invention will be apparent from the consideration of the folowing specification and claims when considered in connection with the accompanying drawings which illustrate embodiments of my invention.

In the drawings illustrating embodiments of my invention:

Figure 1:
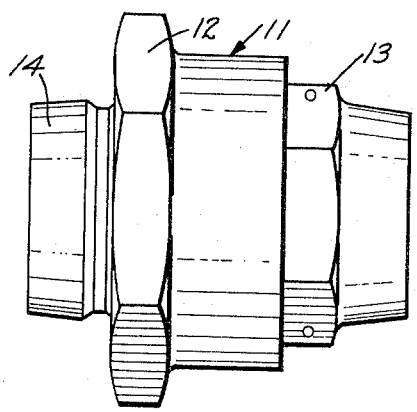
FIG. 1 is a view in side elevation of a coupling constructed according to my invention.

Referring in detail to the drawings, the coupling assembly of the embodiment of FIGS. 1, 2, 3, and 4 is designated 11 and includes a female clamping device 12, a male clamping device 13, and an intermediate coupling member 14. The intermediate coupling member 14 (see FIG. 4) is provided with a convex spherical surface 15 which is formed as an annular segment of an external spherical surface having its center at 16. It is formed on the inner side with a concave portion which is an annular segment of an internal spherical surface which is also formed from the center 16, the internal spherical surface being designated 17.

Figure 2:
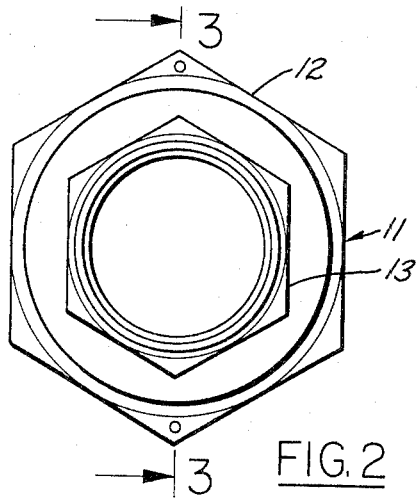
FIG. 2 is a view in end elevation of the coupling of FIG. 1.

It should be here pointed out that heretofore there have been proposed coupling assemblies having three coupling members, the outer two of which may be considered clamping members and the inner one of which may be considered an intermediate coupling member. However, in such coupling members there have not been provided external and internal spherical surfaces on the same member both having the same center. For example, in Park Patent 739,707, Park provides one member (flanged pipe member 1) having one side spherical and the other side flatly bevelled; in FIG. 1, he has another member (unflanged pipe member 2) flatly bevelled to contact the spherical end of the flanged pipe member; and has another member (coupling nut 10) having the contacting side of spherical to seal with the flatly bevelled side of the first named member. In FIG. 2, he has a spherical surface on the end of pipe member 2 and a flat surface on nut 10.

Also, in my copending application Ser. 822,508, I have disclosed a coupling including (1) a male member of which one end has its outer face formed as an annular segment of a spherical surface, and (2) a female member having an outer surface formed as an annular segment of a spherical surface of which the center is coincident with the center of the spherical surface of the male member. Also in my copending application Ser. No. 830,795 which has, on October 3, 1961, matured as Patent 3,002,-771, I disclose a coupling assembly including (1) a male coupling member, the outer side of the face of one end of which is formed as an annular segment of a spherical surface; (2) a female coupling member, the outer side of the face of one end of which is formed as an annular segment of a spherical surface; and (3) a clamping means. I have found by bitter experience, however, that though it is possible to make operative couplings following the procedures and teachings of applications Ser. Nos. 822,508 now abandoned and 830,795 (Patent 3,002,771), yet it is impractical from a commerical standpoint to do so because it is economically impossible to hold a common center in the manufacture of two spaced parts in an assembled coupling.

In the some 60 years since the Park patent was filed, designers have apparently been unable to accomplish a suitable high pressure coupling constructed according to the Park patent. One reason for this is that while it is possible with machine tools in existence to maintain a spherical surface with a definite center line on a single element held in a lathe, when this element is machined and removed and a second element placed in the lathe, a maintenance of a single center becomes extremely difficult if not impossible. A cutting edge generating a spherical cut may be provided, but since the center of rotation of the cutting edge does not coincide with the center line of the lathe stock, a spherical section is generated which is not the same as the segment of a perfect spherical section. Because of the involved procedure in achieving a perfect sphere, most commercial items are not spherical. Now I have discovered that by placing both the concave and the convex spherical surface on a single part and by placing this part intermediate the clamping surfaces, it is possible to achieve exact spherical surfaces about a coincident center and is possible to join together the members without even the necessity of precisely aligning the longitudinal axes of the conduits to be joined.

The coupling member 14 of the embodiment shown in FIGS. 1–4 inclusive is, as previously pointed out, provided with an internal spherical surface 17 formed from the center 16. This spherical surface has a radius $R_1$ from said center 16. The male clamping member 13 of the embodiment shown in FIGS. 1–4, inclusive, includes an end portion which is provided with a surface 18 in contact with the spherical surface 17 of the intermediate coupling member 14. The surface 18 is radiused for a single point contact. It is shown as a rounded surface, but it may be cylindrically or spherically convex having a smaller diameter than the diameter of the spherical surface 17, or it may be a sharp corner. At all events, the contact of the surface 18 with the spherical surface 17 is in engagement at a single line of tangency.

With continued reference to FIGURES 1, 2, 3 and 4, the outer side of the intermediate member 14 includes a spherical surface 15 having a radius $R_2$ originating at the same center 16 as the previously mentioned radius $R_1$ of the spherical surface 17 on the inner side of the coupling member 14.

Figure 3:
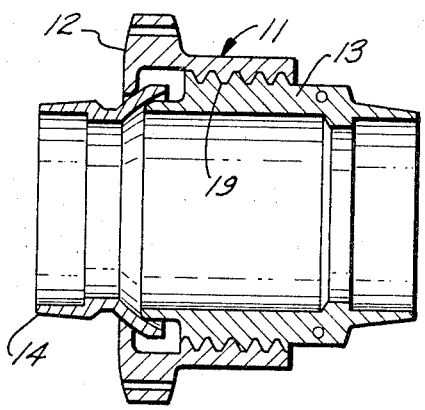
FIG. 3 is a view in vertical section of the coupling of FIGS. 1 and 2, shown on the line 3—3 of FIG. 2.
Figure 4:
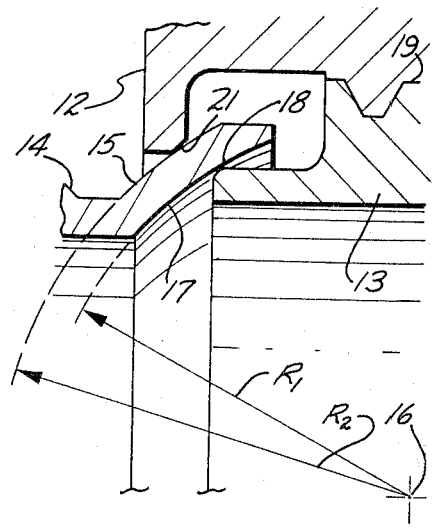
FIG. 4 is an enlarged fragmentary view of a portion of FIG. 3 illustrating the fact that the operative faces of the intermediate coupling members are formed as segments of spheres having a common center.

One of several types of possible clamping means is illustrated in FIG. 3 at 12 and 13. This particular type of clamping means includes the female clamping member 12 in threaded engagement with the male clamping member 13 by means of threads 19. Clamping means 12 includes an inwardly facing surface 21 in engagement with the spherical surface 15 on the outer side of the intermediate member 14. Thus it is apparent that tightening of the clamping device 12 with the clamping device 13 urges the surface 21 into engagement with spherical surface 15, and spherical surface 17 into engagement with the surface 18. Surface 21, like surface 18, is preferably conical for simplicity and economy of manufacture, but can be of any configuration previously described for surface 18 as long as the surfaces meet at a single line of tangency.

The coupling portions of the present invention can be formed of any suitable material without departing from the spirit of the present invention. It should also be pointed out that although the fastening means illustrated comprising clamping devices 12 and 13 is of threaded type, other types of clamping means such as bevelled flange types and clamp-ring types and bolted flange (all well known to those familiar in the art) can be utilized without departing from the spirit of the present invention.

In operation, assuming that a fluid conduit or aircraft tubing is connected to the outer end of, and aligned with, the intermediate coupling member 14 and is either exactly aligned with or slightly misaligned from another fluid conduit or aircraft tubing which is connected to the outer end of and aligned with the male clamping member 13, the longitudinal axis of intermediate member 14 will of course be aligned with or slightly misaligned from (as the case may be) the longitudinal axis of the male clamping member 13. If such misalignment is present, it causes the surface 18 on the clamping member 13 to move along the spherical surface 17 of the intermediate member 14 in constant contacting engagement therewith. Similarly, spherical surface 15 on the intermediate member 14 moves along the conical surface 21 in constant contacting engagement therewith. Hence, when coupling means 12 and 13 are tightened by means of the screw threads 19, all of the surfaces will be urged snugly together in sealed relationship notwithstanding the fact that the longitudinal axis of the intermediate coupling member 14 and the conduit connected thereto are misaligned with the longitudinal axis of the male clamping member and the conduit connected thereto.

It is understood, as suggested above, that the male clamping member 13 is secured to and sealed with a fluid containing tube which has its axis aligned with the axis of the clamping member 13, and that the intermediate coupling member 14 is secured to and sealed with a fluid containing tube which has its axis aligned exactly with the axis of the coupling member 14.

Figure 5:
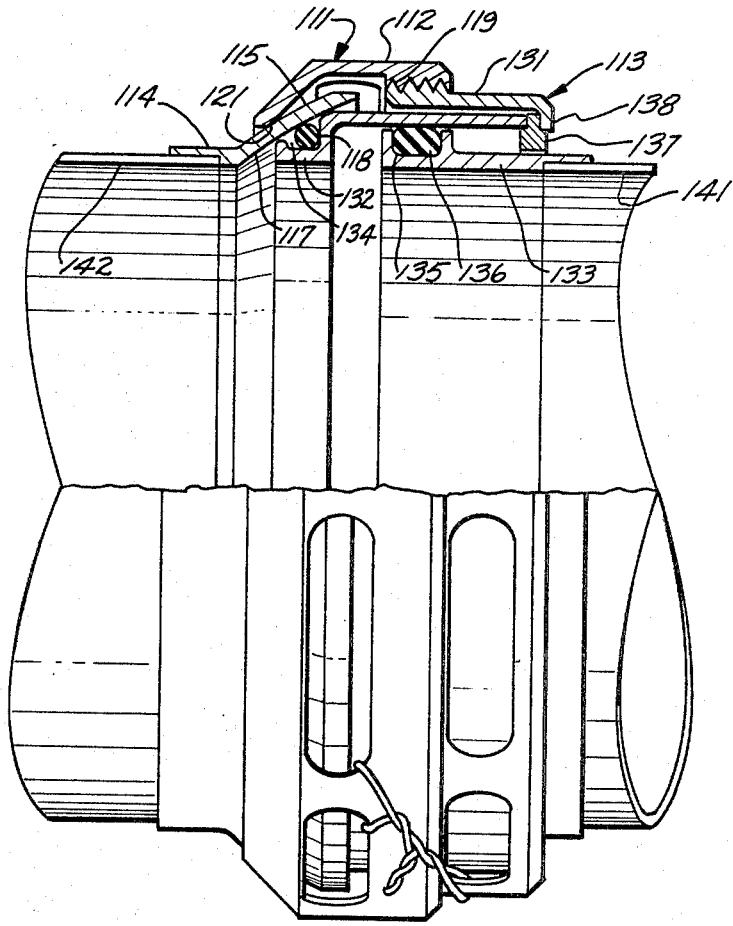
FIG. 5 is a view of a modified form of coupling shown partly in elevation and partly in vertical section and shown on a larger scale.

Referring now to FIG. 5, it may be seen that I have shown a similar coupling arrangement in which the parts are designated by the same numerals as the parts of FIGURES 1, 2, 3 and 4, with the addition of 100. Thus there is shown a coupling 111 consisting of a female clamping device 112, a male clamping device 113, and an intermediate coupling member 114. The intermediate coupling member 114 has external spherical surface 115 and an internal spherical surface 117, the surfaces 115 and 117 having a common center. However, the clamping device 113 consists of several parts. It consists of a threaded clamping member 131, a sealing member 132, and sliding member 133 for connection with a fluid conduit or aircraft tubing. The clamping member 112 is formed with an inner surface 121 which may be conical or flat, or other appropriate shape. The sealing member 132 is formed with a pocket 134 in which there is placed a sealing member 118 which accomplishes the same function as the corresponding surface 18 of clamping member 13 of FIGS. 1, 2, 3 and 4. The member 133 is formed with a pocket 135 in which there is placed a sealing ring 136 for purposes presently to be described. A ring or washer 137 may be provided, if desired, intermediate the member 131 and the member 132, and if provided is so positioned and formed that clamping of the parts together by means of the threads 119 of the members 112 and 131 acts through the flange 138 to force the ring or washer 137 against the end of the member 132 thus moving the sealing member 118 into line contact with the spherical inner surface of the member 114 and sealing with said surface by a line contact. The sealing member may be metallic or non-metallic. In one case I use a soft copper ring which is rectangular in cross section. In other cases, I use a non-metallic O-ring.

In assembling the structure shown in FIG. 5, the parts 112, 114, 131, 132, 133 and 137 are assembled first without the O-ring 118 and are tightened until the metal parts are in hand-tight engagement. The rotational correspondence of members 112 and 131 is marked. The parts are disassembled, the O-ring is inserted and the parts are reassembled, but are tightened only to a point a fraction of an inch from the alignment marked so that the metal parts do not contact and so that the O-ring (which exactly fits in the recess) is completely relaxed, maintains its circular shape and contacts the spherical surface 117 at a single line of tangency.

Aircraft tubing 141 and 142 are secured in fluid-tight relationship with clamping members 113 and intermediate coupling member 114 respectively as shown.

It is to be understood that the above described embodiments of my invention are for the purpose of illustration only, and various changes may be made therein without departing from the spirit and scope of the present invention. Thus, while the embodiments of the present invention as herein disclosed constitute preferred forms, it is to be understood that other forms might be adopted, all coming within the scope of the claims which follow.

I claim:

1. A coupling assembly for connecting in fluid tight relationship a pair of generally oppositely extending fluid conduits notwithstanding possible longitudinal misalignment of said fluid conduits, comprising
a pair of tubular axially adjustable solid clamping devices one of which is a female clamping device and the other of which is a male clamping device and one of which is to be connected in fluid tight sealed relationship with one of said fluid conduits; and
an intermediate solid tubular coupling member, clamped between said clamping devices, having an outer face formed as an annular segment of an external spherical surface which engages the female clamping member at a single line of tangency, having an inner face formed as an annular segment of an internal spherical surface which engages the male clamping member at a single line of tangency, and arranged to be secured in fluid tight sealed relationship with the other of said fluid conduits;
the spherical surfaces of the outer face and of the inner face being segments of two spheres both of which have a common center and wherein any displacement of said lines of tangency relative to each other occurs along concentric arcs.

2. A coupling assembly for connecting in fluid tight relationship a pair of generally oppositely extending fluid conduits notwithstanding possible longitudinal misalignment of said fluid conduits, comprising
a pair of tubular axially adjustable solid clamping devices one of which is a female clamping device having a conical clamping surface and the other of which is a male clamping device having a convex rounded clamping surface and one of which is to be connected in fluid tight sealed relationship with one of said fluid conduits;
an intermediate solid tubular coupling member, clamped between said clamping devices, having an outer face formed as an annular segment of an external spherical surface which engages the conical surface of the female clamping member with a line contact at a single line of tangency, having an inner face formed as an annular segment of an internal spherical surface having a larger radius than the convex rounded clamping surface of the male clamping member and being concentric with the external spherical surface of the outer face, which engages the male clamping member with a line contact at a single line of tangency, arranged to be secured in fluid tight sealed relationship with the other of said fluid conduits and wherein any displacement of said lines of tangency relative to each other occurs along concentric arcs; and
cooperating means for securing said clamping devices adjustably to each other to clamp the intermediate coupling member between them.

3. An assembly comprising
a pair of generally oppositely extending fluid conduits connected in fluid tight relationship notwithstanding possible longitudinal misalignment of said fluid conduits;
a pair of tubular axially adjustable solid clamping devices one of which is a female clamping device and the other of which is a male clamping device and one of which is connected in fluid tight sealed relationship with one of said fluid conduits;
an intermediate solid tubular coupling member, clamped between said clamping devices, having an outer face formed as an annular segment of an external spherical surface which engages the female clamping member at a single line of tangency, having an inner face formed as an annular segment of an internal spherical surface which is concentric with the external spherical surface of the outer face and which engages the male clamping member at a single line of tangency, and secured in fluid tight sealed relationship with the other of said fluid conduits; and
cooperating means for securing said clamping devices adjustably to each other to clamp the intermediate coupling member between them and wherein any displacement of said lines of tangency relative to each other occurs along concentric arcs.

4. An assembly comprising:
a pair of generally oppositely extending fluid conduits connected together in fluid tight relationship notwithstanding possible longitudinal misalignment of said fluid conduits;
a pair of metallic tubular clamping devices one of which is a female clamping device having a relatively flat surface and the other of which is a male clamping device having a relatively rounded surface and one of which is connected in fluid tight sealing relationship with one of said fluid conduits;
an intermediate metallic coupling device clamped between said clamping devices, having (1) an outer face formed as an annular segment of an external spherical surface which engages the relatively flat surface of the female clamping member, said relatively flat surface being appreciably flatter than the external spherical surface, and (2) having an inner face formed as an annular segment of an internal spherical surface which is concentric with the external spherical surface of the outer face and which has a greater radius of curvature than the radius of curvature of the relatively rounded surface of the male clamping member, said intermediate tubular coupling member being secured in fluid tight sealed relationship with the other of said fluid conduits; and
cooperating means for securing said clamping devices adjustably to each other to clamp the intermediate coupling member between them whereby the clamping surfaces of the clamping devices each contact their respective opposed spherical surfaces on the intermediate coupling device with a line contact at a single line of tangency.

5. A coupling assembly comprising, in combination, a pair of generally oppositely extending fluid conduits connected in fluid tight relationship notwithstanding possible longitudinal misalignment of said fluid conduits;

a metallic sleeve having threads at its rear end and formed at its forward end with a female surface formed as an annular segment of the internal surface of a cone;

an intermediate metallic coupling member formed with a convex surface consisting of an annular segment of the external surface of a sphere which is opposed to and contacts said female surface of said clamping device with a line contact at a single line of tangency and formed on its opposite face with a concave surface consisting of an annular segment of the internal surface of a sphere of which the center coincides with the sphere of which the convex surface is an annular segment; and a second clamping device comprising a metallic sleeve having threads and having said threads engaged with the threads of the first named clamping device and having a forward end formed with a rounded surface having a radius of curvature shorter than the radius of curvature of said internal surface of the sphere which opposes and engages said annular segment of said internal surface of the sphere with a line contact.

6. A coupling assembly for connecting in fluid tight relationship a pair of generally oppositely extending fluid conduits notwithstanding possible longitudinal misalignment of said fluid conduits, comprising a pair of tubular clamping devices one of which is a female clamping device and the other of which is a male clamping device and one of which is to be connected in fluid tight sealed relationship with one of said fluid conduits; and an intermediate tubular coupling member, clamped between said clamping devices, having an outer face formed as an annular segment of an external spherical surface which engages the female clamping member at a single line of tangency, having an inner face formed as an annular segment of an internal spherical surface which engages the male clamping member at a single line of tangency, and arranged to be secured in fluid tight sealed relationship with the other of said fluid conduits;

said clamping devices being each formed with threads interengaged with the threads of the other clamping device, by which they are secured to each other and by which they may be tightened to clamp the intermediate coupling member between them; and the spherical surfaces of the outer face and of the inner face being segments of two spheres both of which have a common center and thus are concentric.

References Cited by the Examiner

UNITED STATES PATENTS

| | | | |
|---|---|---|---|
| 954,549 | 4/1910 | Turner | 285—334.4 X |
| 1,652,064 | 12/1927 | Sweney | 285—263 |
| 1,710,267 | 4/1929 | Mueller | 285—261 |
| 1,714,563 | 5/1929 | Kiel | 285—263 |
| 1,780,693 | 11/1930 | Yazel | 285—165 X |
| 1,974,780 | 9/1934 | Mann | 285—364 X |
| 2,025,113 | 12/1935 | Laurent | 285—261 |
| 2,521,127 | 9/1950 | Price | 285—347 X |
| 2,646,996 | 7/1953 | Parmesan | 285—354 X |
| 2,837,360 | 6/1958 | Ladd. | |
| 2,846,242 | 8/1958 | Drake | 285—263 |
| 2,918,313 | 12/1959 | Lazar et al. | 285—261 X |
| 3,002,771 | 10/1961 | Chakroff | 285—261 X |

FOREIGN PATENTS

| | | |
|---|---|---|
| 1,061,142 | 7/1959 | Germany. |
| 4,324 | 5/1891 | Great Britain. |
| 474,963 | 10/1952 | Italy. |
| 538,717 | 6/1956 | Italy. |

CARL W. TOMLIN, *Primary Examiner.*

EDWARD C. ALLEN, *Examiner.*

J. SCHWOYER, D. W. AROLA, *Assistant Examiners.*

UNITED STATES PATENT OFFICE
CERTIFICATE OF CORRECTION

Patent No. 3,273,917　　　　　　　　　　September 20, 1966

Richard O. Chakroff

It is hereby certified that error appears in the above numbered patent requiring correction and that the said Letters Patent should read as corrected below.

Column 7, line 31, after "contact" insert the following: -- at a single line of tangency; and cooperating means for securing said clamping devices adjustably to each other to clamp the intermediate coupling member between them --.

Signed and sealed this 1st day of August 1967.

(SEAL)
Attest:

Edward M. Fletcher, Jr.　　　　　　　　　EDWARD J. BRENNER
Attesting Officer　　　　　　　　　　　　Commissioner of Patents